Patented Apr. 21, 1953

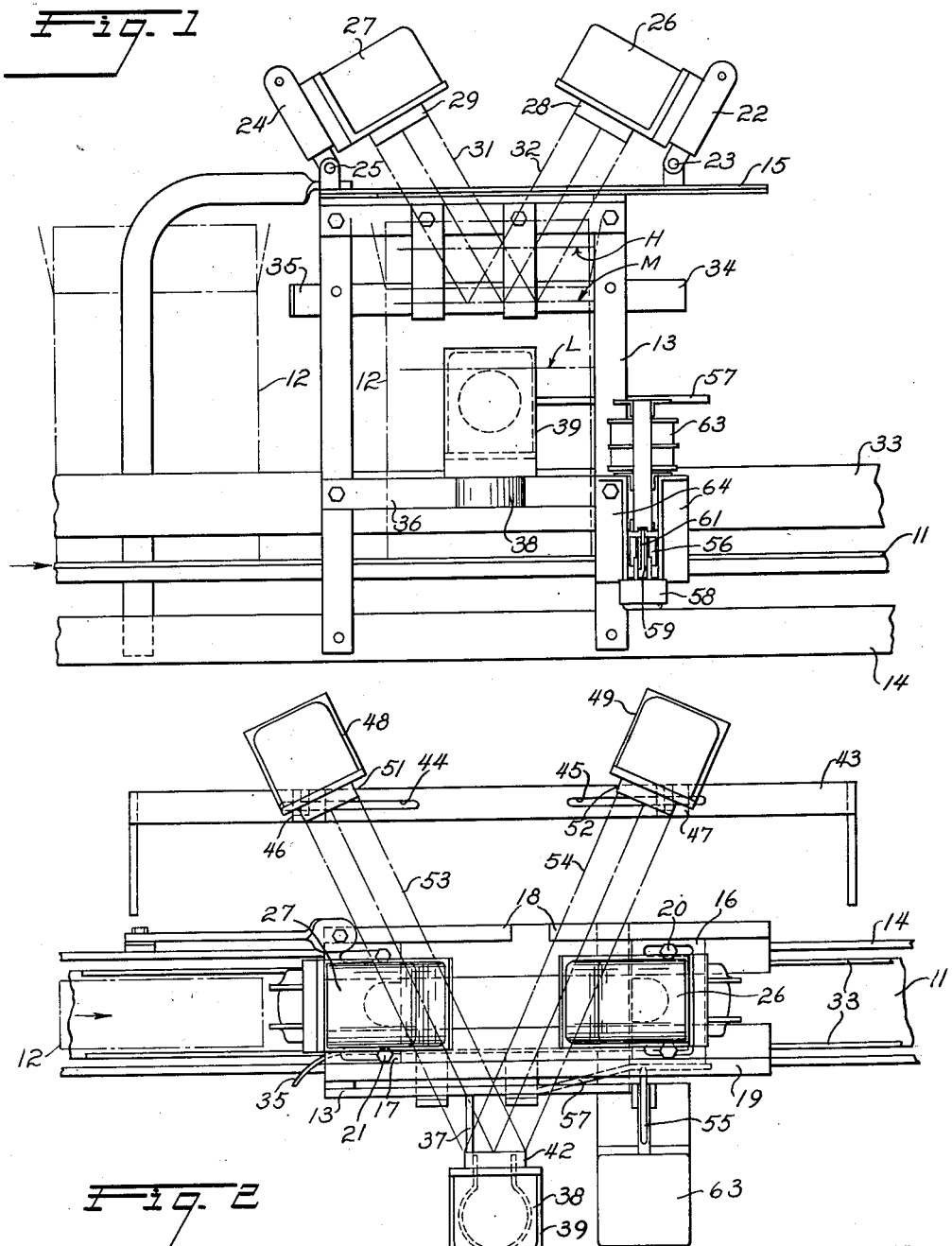

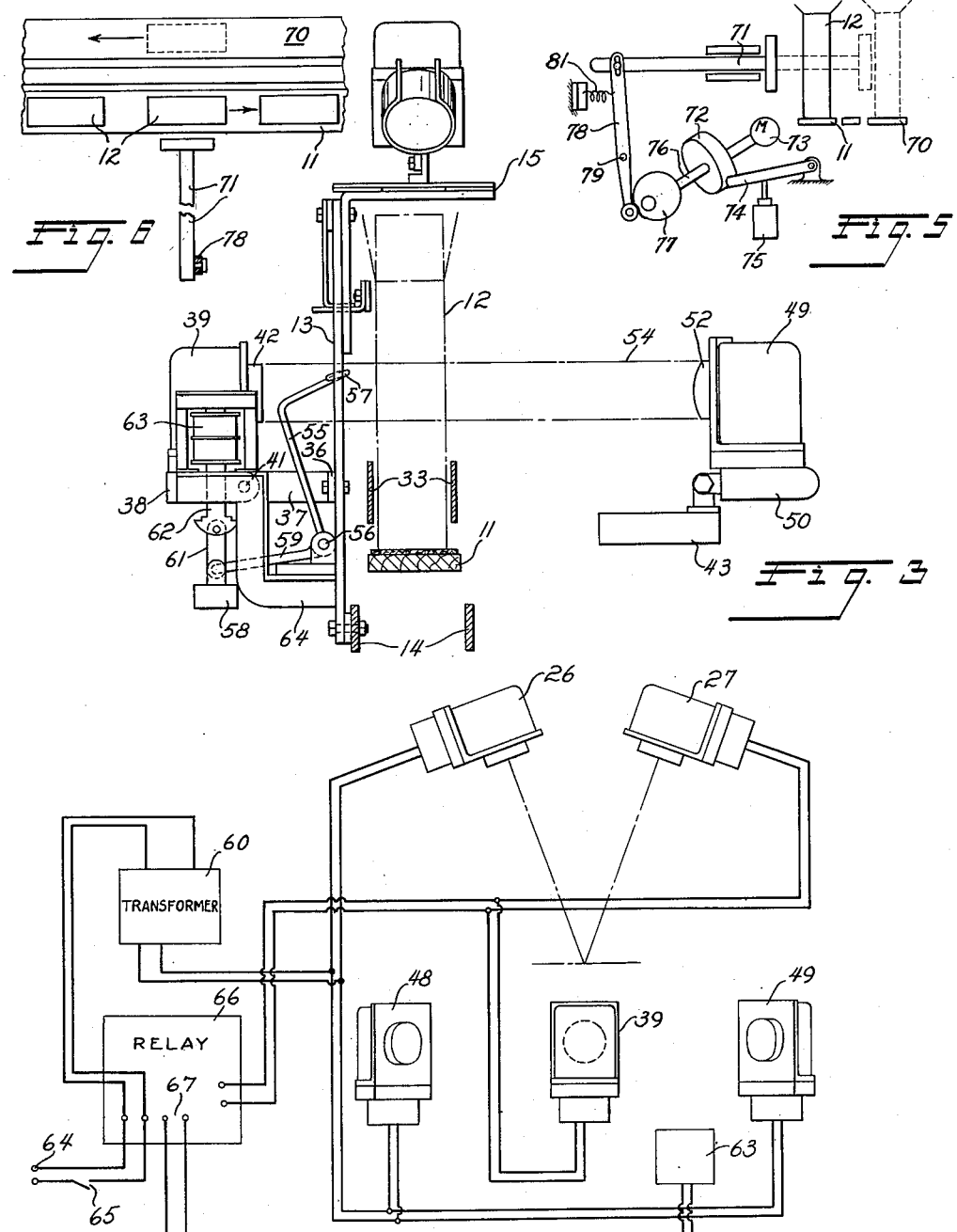

2,635,747

UNITED STATES PATENT OFFICE 2,635,747

INSPECTION APPARATUS

Harley Roland Hughes, Louisville, Ky., assignor to Colgate-Palmolive-Peet Company, Jersey City, N. J., a corporation of Delaware Application May 29, 1947, Serial No. 751,496

3 Claims. (Cl. 209—82)

This invention relates to light sensitive inspection apparatus and is particularly concerned with such apparatus for inspecting and/or measuring the level of the contents of moving containers.

The preferred embodiment of the invention will be described herein as applied to the inspection of the level of a dry granular substance such as soap powder in a series of containers passing through an automatic packaging apparatus, together with associated photoelectric means for determining the inspection interval so that the container itself controls inspection and rejection operations.

This is an improvement over the apparatus of the copending application of myself and Curtis D. Rice Serial No. 601,530 filed June 25, 1945, now Patent No. 2,529,081 wherein is disclosed a photoelectric inspection apparatus in which the moving container engages a light shutter control lever as it enters the inspection station to render the inspection and rejection device responsive solely to the scanned substance level in the container while the latter is in the inspection station. I have found that this trip lever arrangement is satisfactory where the filled containers are fairly heavy, but where the packaged substance is relatively light, as certain detergent powders, difficulty is encountered in that the moving container may not be substantial enough to push the trip lever aside and thus may fail to activate the inspection apparatus.

The present invention overcomes this difficulty in that it substitutes an additional photoelectric control for the mechanically operated trip lever of the application, whereby the inspection operation is made independent of the container weight and makes certain refinements in the apparatus as will be described below.

It is therefore the major object of my invention to provide a novel apparatus for determining the level of a substance in a moving container wherein photoelectric means controlled by movement of a container into the inspection station activates associated photoelectric means adapted to scan the substance level and eject the container if it is improperly filled. Either the container or the substance, or both, may be opaque.

Further objects of the invention will appear as the description proceeds in connection with the appended claims and the annexed drawings wherein:

Figure 1 is a side elevation of an inspection apparatus according to a preferred embodiment of the invention;

Figure 2 is a top plan view of the apparatus of Figure 1 illustrating the container controlled photoelectric system;

Figure 3 is an end view mainly in section of the apparatus of Figures 1 and 2;

Figure 4 is a schematic and wiring diagram of the apparatus;

Figure 5 is a diagrammatic view of a further type of container ejector where an improperly filled container is transferred to another conveyor; and Figure 6 is a diagrammatic plan view corresponding to Figure 5.

Figure 1 in the preferred embodiment illustrates an inspection station on a conveyor line between an automatic filling machine and a suitable container closing device. A flat conveyor 11, preferably of the endless belt type, carries a succession of filled containers 12 through the inspection station with their top flaps open to permit scanning of the substance level.

A frame 13 arises at one side of the conveyor support 14 and has a horizontal upper shelf 15 projecting over the conveyor at a height sufficient to clear the moving containers. Plates 16 and 17 at opposite ends of shelf 15 are slidably adjustable toward and away from each other parallel to the conveyor in suitable guides 18 and 18, bolt and slot assemblies 20 and 21 in the plates and shelf providing for locking the plates in adjusted position.

Upstanding from plate 16 is a lug on which a flexible clamp 22 is adjustably pivoted at 23. A similar flexible clamp 24 is adjustably pivoted at 25 on plate 17. Clamps 22 and 24 support respectively a housing 26 for a photoelectric cell and a housing 27 for a light source, light being used in the sense of radiation of any suitable wavelength which will activate the photocell. Housing 26 is provided with a cylindrical front baffle 28, and housing 27 is provided with a similar baffle 29 whereby the light emitted from housing 27 is confined to the beam indicated at 31, and the baffle 28 substantially prevents entry into housing 26 of light other than along the reflected beam path indicated at 32.

Housings 26 and 27 are centered transversely of the conveyor and are preferably so arranged that beam 31 intersects the substance level at about 45° to the horizontal and the reflected light path 32 is also about 45°. In Figure 1 a properly filled container 12 is illustrated as it passes through the inspection station, with the light from beam 31 reflected from the average acceptable substance level M into the photocell housing 26. The adjustments at 20, 21 and 23, 25 permit the apparatus to be used with containers of different length along the conveyor and different substance levels. As illustrated, should the substance level be too high, as at H, or too low as at L, the light beam 31 will not be reflected into housing 26, but any substance level between these limits will reflect some light into housing 26. Since the response of the photoelectric cell at 26 is proportional in magnitude to the strength of the entering light, by suitable circuit adjustments I can narrow the permissible range of substance levels. The same result can be obtained by suitable baffles.

Where the container 12 is a rectangular box, as in the preferred embodiment, I provide stationary parallel guides 33 at the inspection station for centering the containers, and at the level of the top of the box I provide on frame 13 a stationary flat guide shoe 34 parallel to the conveyor and having a curved front face 35 to aid in centering the container on the conveyor.

A horizontal frame member 36 carries an outwardly extending support arm 37 on which a clamp 38 for a photoelectric cell housing 39 is adjustably pivoted on a horizontal axis at 41. Preferably housing 39 is located generally centrally of the inspection station as illustrated in Figure 1 and with the axis of its cylindrical front baffle 42 horizontal and normal to the conveyor direction. Cylindrical front baffle 42 on housing 39 restricts the field of the photocell.

On the other side of the conveyor from photocell housing 39, a stationary support 43 extends parallel to the conveyor. Support 43 is formed with slots 44 and 45 in which lamp housing bases 46 and 47 are slidably adjustable toward and away from each other. Lamp housings 48 and 49, secured to their bases by clamps 50 like that at 24, are provided with cylindrical front baffles 51 and 52 that convergently direct horizontal pilot light beams 53 and 54 at equal angles across the conveyor at the inspection station to intersect within photocell housing 39. Housings 39, 48 and 49 are at the same horizontal level.

The position and adjustment of lamp housings 48 and 49 are such that a container moving through the inspection station will cut off the light pass defined by both beams 53 and 54 at the same time for a predetermined period which is a function of the dimension of the container along the conveyor and the linear speed of the container. The adjustments of housings 48 and 49 enable use of the apparatus with different container sizes.

A container ejecting member 55 is horizontally pivoted on frame 13 at 56 and has an elongated container engaging bar 57 normally held out of the path of the container by a weight 58 hung on the end of a bell crank extension 59 of ejector 55. Weight 58 is pivotally connected by a link 61 to the armature 62 of a solenoid 63 mounted on a bracket 64 rigid with frame 13. When solenoid 63 is deenergized, weight 58 holds the parts in the positions illustrated in Figure 3. When solenoid 63 is energized, armature 62 is pulled up and acts through link 61 to rock ejector 55 clockwise in Figure 3 to transversely move bar 57 over the top of the conveyor and cause any container 12 that may be in its path to be dumped laterally off the conveyor.

Figure 4 illustrates the general circuit arrangement. The usual 110 volt input line terminal at 64 includes a switch 65 and is connected to the primary of a transformer 60 having a 6-8 volt secondary connected to the lamps within lamp housings 26, 48 and 49. These lamps are energized when switch 65 is closed. The input line also supplies energy to a suitable relay device 66 that contains a suitable control circuit for amplifying the photocell current and controlling the energization of output terminal 67. The photoelectric cells in housings 27 and 39 which are preferably of the gas discharge type are connected in parallel and to the common circuit within relay 66. When switch 65 is open the whole system of Figure 4 is deenergized and the parts are maintained as in Figure 3. The relay circuit characteristics are such that when either or both of the photoelectric cells are energized by incident light from the lamp housings so as to provide a predetermined current flow in their common circuit, the output terminal 67 is maintained deenergized and the ejector maintains the position of Figure 3. This condition prevails when there is no container wholly within the inspection station, or when the substance level in a container at the inspection station is within permissible limits. The illumination level of the lamps at 26, 48 and 49 is much higher than the normal room light level, lenses being preferably used to collimate the beams, so that there is no control unless switch 65 is closed.

When switch 65 is closed to energize the system, and the light beams to both photoelectric cells are simultaneously cut off, as when a container cuts off both beams 53 and 54 in the inspection station and the substance level in the container is either too low or too high to reflect beam 31 into cell housing 26, the photocell controlled current flow in the circuit falls below a predetermined amount and trips a switch or the like (not shown) to energize terminals 67 and therefore activate solenoid 63 to cause ejector 55 to dump the improperly filled container from the conveyor. As soon as the container is dumped, the light beams 53 and 54 are unblocked and the solenoid is deenergized so that the parts return to the position of Figure 3.

During operation, with switch 65 closed, a series of open topped spaced containers are moved through the inspection station. For a brief interval, as illustrated in Figure 1, each container is disposed at the inspection station and cuts off light beams 53 and 54 simultaneously, so that during that interval the ejector 55 is under the sole control of the substance level scanning light and photocell combination, and any improperly filled container will be immediately dumped from the conveyor.

No attempt has been made to describe the specific amplifying and control circuit details within relay 66, it being understood that such may comprise any suitable circuit that energizes solenoid 63 when light is cut off to both photocells and deenergizes solenoid 63 whenever light is received by either photocell. In practice I have used at 66 the relay device made by the General Electric Company designated as their Photoelectric Relay CR7505A100.

My improved device accurately detects and immediately ejects improperly filled containers. As each container enters the station it intercepts light beam 53, but is not subjected to control of the level scanning device until it has advanced wholly within the station and cuts off both beams 53 and 54. As soon as the trailing end of the container passes beam 53, the ejector is immediately rendered inoperative.

Sometimes the upstanding open flap at the leading end of the container when part way through the inspection station will temporarily cut off beam 31, but at that time beam 54 is still unblocked and prevents energization of the ejector. By the time that the container reaches the position where it intercepts both beams 53 and 54, the leading flap has unblocked beam 31 and the surface of the substance is exposed for scanning. Thus my improved device makes the inspection operation independent of the container mass and independent of accidental cut off by the upper flaps of the container.

Instead of dumping improperly filled containers off the conveyor 11, I may merely transfer them onto another conveyor 70 running side by side with conveyor 11 but in the opposite direction and leading away from the inspection station, to prevent spilling the rejected container contents. As illustrated in Figures 5 and 6 this may be accomplished by a horizontally reciprocating pusher 71, suitably operated through a single revolution clutch 72 driven by a separate electric motor 73 or by a power take off in the apparatus. Such a clutch could be of the construction disclosed in United States Letters Patent No. 2,283,962 with a trip control lever 74 connected to the armature of a solenoid 75 under control of the above described photoelectric devices. For example this solenoid 75 may be the earlier described solenoid 63 connected to the clutch trip mechanism for operating pusher 71 through a single stroke cycle whenever an improperly filled container is detected at the inspection station. The output shaft 76 of clutch 72 carries an eccentric 77 for rocking a lever 78 pivoted at 79 and connected by a pin and slot to the reciprocable pusher 71. Lever 78 is biased in one direction by spring 81 so that pusher 71 is normally maintained in the full line position of Figure 5.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In apparatus for checking the filling of containers, a conveyor for moving open-topped containers each having an upstanding closure flap at its leading end in succession through an inspection station, a photoelectric inspection device at said station comprising means for projecting a beam of light downwardly onto the surface of the substance within the container at the inspection station and light sensitive means for receiving light reflected from said surface within a predetermined angular zone, means operated by said device for ejecting improperly filled containers from said conveyor, means on one side of the conveyor for projecting a light pass substantially equal to but slightly less than the width of the container taken in the direction of movement of the conveyor and further light sensitive means in the path of said light pass, said light pass extending a predetermined horizontal distance above the conveyor so that while passing through said station each container will block said light pass for a predetermined period when said container is positioned wholly within said station with its leading closure flap clear of said inspection light, and means connecting said further light sensitive means to permit actuation of said container ejecting means by said first light sensitive means only when said container wholly blocks said light pass.

2. In photo-electric apparatus for inspecting a moving succession of filled open topped containers and for rejecting improperly filled containers, an inspection station, a conveyor for moving said succession of containers through said station, a photoelectric scanning device above the containers at said station for measuring the substance level in each container, means for controlling actuation of said scanning device comprising means for projecting two horizontally spaced light beams across said conveyor at said station and light sensitive means for receiving said beams after traversal of the conveyor, said light beams defining light passes having a predetermined effective width above the conveyor in the path of movement of the container which is slightly less than the dimension of the container in that direction, a container ejection device at said station, and means operable only during the period that the container disposed at said station intercepts both said light beams for rendering said ejection device controllable by said scanning device.

3. Apparatus for checking the level of a substance in a succession of containers which comprises in combination means defining an inspection station containing light sensitive means which includes two separate but operably associated photoelectric cell units, a conveyor for transporting a succession of filled containers each having an upstanding closure flap on its leading end to said station, container handling means operably associated with said light sensitive means and adapted to remove improperly filled containers from said conveyor, means for directing a beam of light onto the substance in a filled container located at said station wherefrom it is reflected toward one of said photoelectric cell units, means directing a pilot light pass substantially equal to but slightly less than the width of the container taken in the direction of movement of and a predetermined distance above the conveyor onto said second photoelectric cell unit at said station, said pilot light being wholly intercepted upon predetermined positioning of a container within said station whereby said light sensitive means is exposed only to light reflected from said substance during only a limited interval while a container is at said station and said leading closure flap has cleared said inspection light beam.

HARLEY ROLAND HUGHES.

References Cited in the file of this patent

UNITED STATES PATENTS

| Number | Name | Date |
| --- | --- | --- |
| 2,142,920 | Rose | Jan. 3, 1939 |
| 2,280,948 | Gulliksen | Apr. 28, 1942 |
| 2,395,482 | Hurley | Feb. 26, 1946 |
| 2,529,081 | Hughes | Nov. 7, 1950 |

FOREIGN PATENTS

| Number | Country | Date |
| --- | --- | --- |
| 405,243 | Great Britain | Apr. 28, 1932 |